INVENTORS
RAYMOND H. BEYER
JOSEPH E. BURKE
DONALD J. HALSEY

ATTORNEY

May 14, 1963  R. H. BEYER ET AL  3,089,417
EXPLOSIVE CABLE-CUTTING FITTING
Filed Jan. 23, 1961  2 Sheets-Sheet 2

INVENTORS
RAYMOND H. BEYER
JOSEPH E. BURKE
BY  DONALD J. HALSEY

George J. Rubens
ATTORNEY

United States Patent Office 3,089,417
Patented May 14, 1963

3,089,417
EXPLOSIVE CABLE-CUTTING FITTING
Raymond H. Beyer, Fort Worth, Joseph E. Burke, Dallas, and Donald J. Halsey, Arlington, Tex., assignors, by mesne assignments, to the United States of America as represented by the Secretary of the Navy
Filed Jan. 23, 1961, Ser. No. 84,466
2 Claims. (Cl. 102—24)

This invention relates to cutting devices, and more particularly to such a device which explosively can cut elongate elements such as tubes, cables, rods or the like.

High performance aircraft presently being designed will make provisions for capsular escape. Such aircraft are to be constructed with a pilot enclosed capsule that can be separated from the parent aircraft in flight and parachuted or floated to safety. In order to free the capsule in flight, in addition to separation of the fuselage portions, it is also necessary to sever instantly all control rods, tubes, cables and the like passing from the capsule to the airplane proper.

In a prior U.S. application Serial No. 82,142 filed on January 11, 1961, by one of the present coinventors, an explosive quick-disconnect was proposed for severing cables, rods and the like, wherein respective free ends of the cables are releasably secured together by the disconnect. In certain application, such as for the separation of tubes, bundles of conductors, etc. the use of such a mechanical disconnect is not readily suitable.

The present invention provides an explosive separation fitting constructed of a body preferably in separable sections, for mounting on and clamping transversely around the tube or wire bundle to be separated at any desired point without the requirement that free ends of the tube or bundle of wires be available. The fitting supports a shaped explosive charge which is detonated electrically to sever the tube or the like about which the fitting is attached. By using a parallel arrangement of a pair of shaped charges and primers, the reliability standards can be greatly enhanced. The configuration of the shaped charges can be varied to accommodate any particular installation.

Instead of clamping the fitting directly on the tube etc., as heretofore described, the fitting can be constructed to be secured to a bulkhead in the aircraft and the tube etc. passed through and clamped to the fitting. The fittings can be designed in a range of sizes to accommodate the various tubes, rods, etc. used on the aircraft.

A principal object of this invention is to provide an explosive fitting that can be installed firmly on a tube, rod, wire bundle, etc. for severing same; and an important corollary object is to provide such a fitting that can be installed at any time without disconnecting, cutting or disassembling of the tube, rod, wire bundle, etc.

Further objects are to provide an explosive fitting that can be attached to an airplane bulkhead and pass the tube or the like through the fitting and be secured thereto; to provide a fitting that is compact and one that is easily and quickly installed on the tube; and to provide such an explosive fitting within accepted reliability standards.

Other objects and many of the attendant advantages of this invention will be readily appreciated as the same become better understood by reference to the following detailed description when considered in connection with the accompanying drawings wherein.

Figure 1:
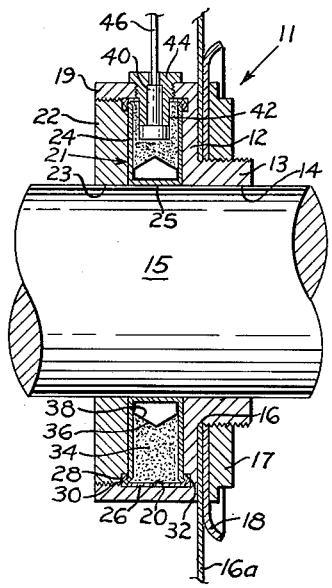
FIG. 1 is a longitudinal section taken through one embodiment of an explosive fitting of this invention shown installed to a bulkhead and supporting a cable to be severed, the cable being illustrated in phantom lines.

Referring to the drawing where like reference numerals refer to similar parts throughout the drawing, there is shown in FIG. 1 an explosive fitting 11 constructed in accordance with the present invention. Fitting 11 comprises an annular body member 12 having a hub portion 13 and a bore 14 through which is passed the elongate element 15 to be severed such as a tube, bundle of conductors, wire, hereinafter generally referred to in this specification as a cable. The hub portion is adapted to project through an opening 16 of a bulkhead 16a and is secured thereto by a threaded nut 17 and a washer 18, whereby the cable is supported to the bulkhead. Body member 12 includes a larger diameter annular flange 19 forming a circular recess 20 for housing an explosive element 21, which element is secured therein by a threaded holder 22 having a bore 23, coextensive with bore 14, through which the cable passes.

Explosive element 21 is constructed ring-shaped and comprises a thin walled case 24, which can be of metal or plastic sheet composition, to provide ease in shielding, handling, shipping, storage and installation. Case 24 has a bore 25 to receive the cable, and an outer cap 26 crimped to the remainder of the case at 28 and housed in recesses 30 and 32 in the holder and body, respectively. Mounted within case 24 is a ring-shaped explosive material 34 of detonating material, in cast or compressed solid form, such as cyclonite, which is a homogeneous mixture of cyclotrimethylenetrinitramine, known as "RDX," a plasticizer such as microcrystalline wax and minute air bubbles. The inner peripheral surface of explosive ring 34 is formed with an annular V-shaped groove 36 with the mouth facing the cable surface, which directs the explosion to propagate in the form of a cutting jet primarily radially inwardly against the cable. Thus, this explosive characteristic differs from other kinds of explosives that propagate equally in all directions. The V-shaped groove is covered with a molded or preformed thin coating 38 of steel, brass, copper or the like called a converger. The cut to be made, that is, the distance from the focus of the beam through the cable to be cut, will be varied in accordance with the requirement of each use. The space provided by case 24 between the shaped charge and the cable guards the gas from interference from any extraneous solids until the gas attains the desired focused form to assure an effective cutting beam.

A primer 40 of conventional design is seated within a recess 42 formed in the explosive charge, and is secured therein by a holder 44 threaded to flange 19. Conductors 46 connect the primer to a suitable firing circuit, not shown. The primer is designed to be separable of the shaped charges, and not a part thereof, as a safety factor so that it can be installed after assembly of the fitting on the cable.

When the shaped charge is set off by the primer through the firing circuit, an intense internal shock wave is created in the charge. The minute entrained air bubbles in the cyclonite are subject to high pressures and, in compressing, create intense heat. Successive shock waves set off by the detonation causes the converger material 38 to crumble and to spall-off and coalesce into a thin jet directed toward the cable severing it in a fraction of a microsecond.

Figure 2:
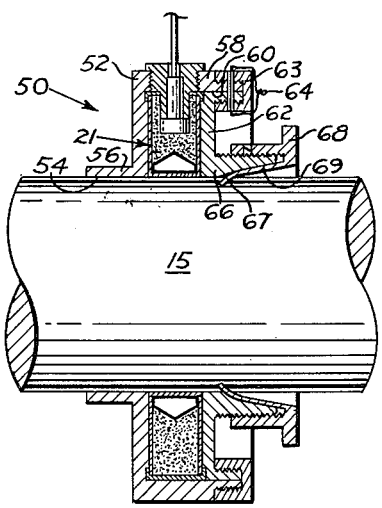
FIG. 2 is a longitudinal section of a modified explosive fitting installed directly on, and support by, the cable.

FIG. 2 shows an explosive fitting 50 differing from fitting 11 of FIG. 1 in that fitting 50 is mounted directly on a cable 15 at a point independent of a bulkhead. The explosive element 21 is identical to the element of FIG. 1 and is supported in a body 52 having a bore 54 and an adjacent hub 56 for lateral support to cable 15 threaded therethrough. Body 52 is formed with an outer annular flange 58 forming a recess 60 to house explosive element 21 which is secured therein by a holder 62. A U-shaped annular lock ring 63 slips over flange extensions of body 52 and holder 62 and is secured thereto by a lock wire 64. Holder 62 is formed with a hub portion 66 having a flared bore 67 and externally threaded to support a nut-like cable lock 68. Lock 68 has longitudinally extending resilient fingers 69 which slide along the flared bore surface to bite into the cable as the lock 68 is screwed on hub portion 66, thereby anchoring fitting 50 to the cable at the desired point.

Figure 3:
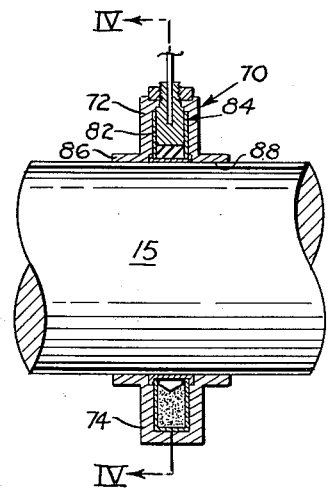
FIG. 3 is a longitudinal section of another modification of the explosive fitting installed directly on a cable.
Figure 4:
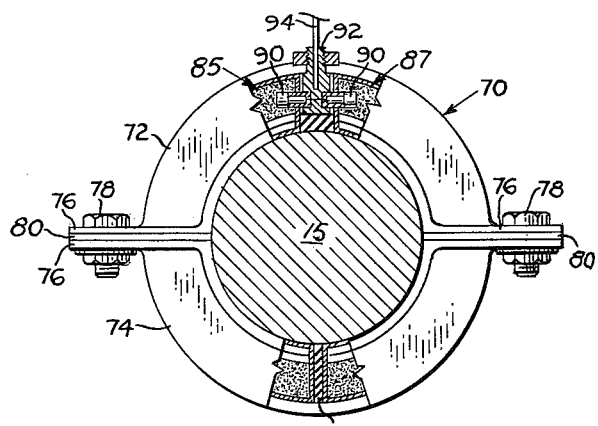
FIG. 4 is a transverse section line IV—IV of FIG. 3.

FIGS. 3 and 4 disclose another modified explosive fitting 70 for severing a cable 15. The fitting comprises a pair of semicircular upper and lower body halves 72 and 74, respectively, each having integral lug portions 76 for clamping the fitting to the cable by bolts 78 through a resilient gasket seal 80. The body halves have a channel-shaped construction to provide a housing 82 for an explosive element 84, the body halves having annular flanges 86 adjacent bore 88 of the fitting for lateral support to the cable. Explosive element 84 consists of a pair of semicircular ring-shaped charges 85 and 87 each of which may be similar in composition and cross-sectional construction to explosive element 21 of FIG. 1. A resilient seal 89 separates the charges at one end, and at the other end each charge is provided with a respective primer 90 supported by a common holder 92 in a T-shaped connection, and connected by conductors 94 to a suitable firing circuit, not shown. Such a parallel arrangement of explosive charges and primers greatly increases the reliability standards as either charge is capable of completely cutting the cable.

Figure 5:
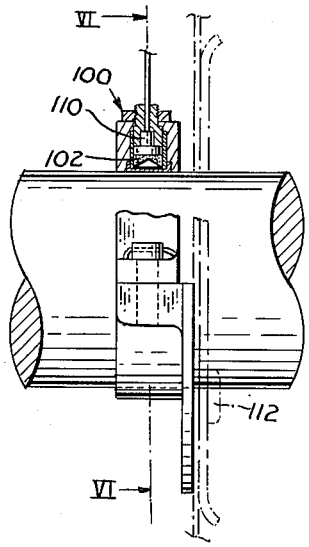
FIG. 5 is a partial longitudinal section of still another modification of an explosive fitting installed to a bulkhead.
Figure 6:
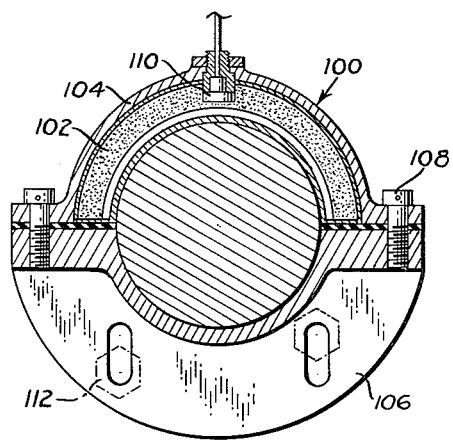
FIG. 6 is a partial transverse section taken along line VI—VI of FIG. 5.

FIGS. 5 and 6 illustrate still another modified fitting 100, similar to fitting 70 of FIGS. 3 and 4 except that only one semicircular ring-shaped explosive element 102 is utilized. Element 102 is housed within a channel shaped case 104, the other side of the fitting being a semicircular solid body 106 secured to case 104 by screws 108 to encircle cable 15. The details of the explosive element 102 and primer 110 are similar to those members previously described. In FIGS. 5 and 6, the cutting power of the semicircular explosive element is sufficient to sever cable 15. Body 106 may be secured to bulkhead 16a by suitable bolts 112.

Figure 7:
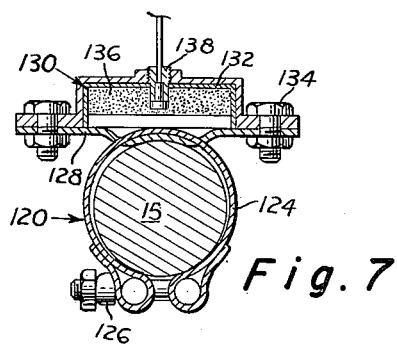
FIG. 7 is a transverse section of a further modification of an explosive fitting having a straight shaped charge mounted directly on a cable.
Figure 9:
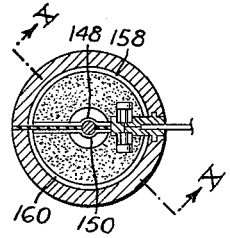
FIG. 9 is a transverse section taken along line IX—IX of FIG. 8.

FIG. 7 illustrates a modified explosive fitting 120, comprising a strap 124 adapted to encircle cable 15 and be tightened thereto by a conventional toggle-type clamp 126 securing the strap ends. A holder 128 is clamped at an intermediate portion between strap 124 and the cable, the holder supporting a shaped charge 130 within a case 132 that is bolted at 134 to the holder. The shaped charge 130 including the explosive element 136 and primer 138 may be identical in detailed construction with those previously described, differing only in the fact that it is configured to be straight and extending approximately tangent to the cable, although for all practical purposes the shaped charge could be made curvilinear with respect to the cable, similar to the construction of FIG. 6.

Figure 8:
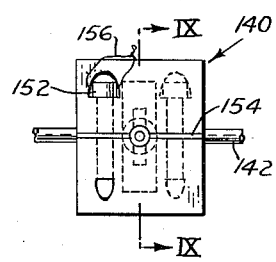
FIG. 8 is a side elevation view of still a further modification of an explosive fitting clamped directly on a single wire-type elongate element.
Figure 10:
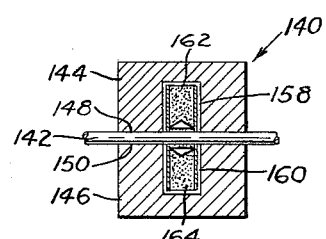
FIG. 10 is a longitudinal section taken along line X—X of FIG. 9.

FIGS. 8 and 10 disclose still another modified explosive fitting 140 adapted to sever a single strand-type cable 142 as distinguished from a tubular element or a bundle of cables as shown in FIGS. 1 through 7. Fitting 140 comprises a body of semicylindrical halves 144 and 146 having corresponding mating bores 148 and 150 to permit passage of cable 142, the halves being secured to the cable by a pair of transverse screws 152 and the connection sealed by a resilient seal 154. Screws 152 are locked together by wire 156. Core openings 158 and 160 in the fitting halves house respective shaped charges 162 and 164. The latter may be identical in construction to shaped charges 85 and 87 of FIGS. 3 and 4, except for size, and therefore their description need not be repeated.

The present invention provides a small, simple explosive fitting for instantaneous severing of all types of cables, hollow or solid, normally used on aircraft to permit separation of one part of the aircraft with an adjacent portion, such as an escape capsule. The explosive fitting can be clamped over cable at any desired location or attached to a bulkhead for supporting the cable thereto. One or more shaped charges can be used in a parallel arrangement to obtain increased reliability. The shaped charges can be in a variety of configurations depending on the requirements of any particular installation. The fitting is U-shaped, and may be straight or curved and constructed of one or more separable halves which can be clamped on the cable, etc. in the aircraft after test and check out on the ground and before flight. The fittings can be constructed in a range of sizes, for example, to accommodate from 3 inch to .093 inch diameter rods, tubes and cables. The explosive fittings are constructed to be handled and stored in complete safety. The shaped explosive charges are directed radially inwardly toward the cable and are spaced from the cable to insure an effectively formed cutting beam.

Obviously many modifications and variations of the present invention are possible in the light of the above teachings. It is, therefore, to be understood that within the scope of the appended claims the invention may be practiced otherwise than as specifically described.

We claim:

1. An explosive fitting for attachment around a cable or the like and capable of severing the cable comprising:

(a) a separable holder for supporting a shaped charge;

(b) said holder comprising a base member and a cover member;

(c) means for detachably connecting said members;

(d) said charge being elongate, and the holder supporting the shaped charge in a position oriented transversely the cable;

(e) said cover member having an opening for insertion of a primer into the charge for igniting same;

(f) removable means for supporting said primer in the holder;

(g) a strap having free ends connected to said base member for clamping the holder to the cable; and (h) means for drawing said free ends together in clamping relation whereby the holder can be fixed to the cable to be severed at any desirable location.

2. The fitting of claim 1 wherein (a) the base member has spaced slots freely to receive said strap for positioning on the cable.

References Cited in the file of this patent

UNITED STATES PATENTS

| | | |
|---|---|---|
| 2,335,952 | Martin | Dec. 7, 1943 |
| 2,587,243 | Sweetman | Feb. 26, 1952 |
| 2,763,210 | Church et al. | Sept. 18, 1956 |
| 2,873,676 | Caldwell | Feb. 17, 1959 |
| 2,889,885 | Hildebrandt | June 9, 1959 |
| 2,920,532 | McBride | Jan. 12, 1960 |
| 3,036,522 | Lindsey | May 29, 1962 |